UNITED STATES PATENT OFFICE 2,474,821

QUINOLINE COMPOUNDS AND PROCESS OF MAKING SAME

Joseph H. Burckhalter, Detroit, Eldon M. Jones and Albert L. Rawlins, Grosse Pointe Woods, Frank H. Tendick, Grosse Pointe Park, and Walter F. Holcomb, Detroit, Mich., assignors to Parke, Davis & Company, Detroit, Mich., a corporation of Michigan No Drawing. Application November 5, 1945, Serial No. 626,906

9 Claims. (Cl. 260—286)

This invention relates to the manufacture of certain new and useful quinoline compounds having the formula,

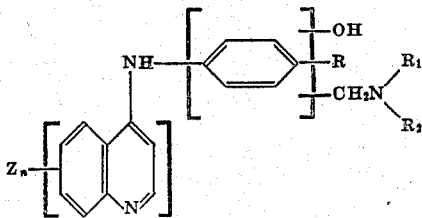

where Z is hydrogen, halogen, —CN, —COOH, —COO(lower alkyl), lower alkyl or lower alkoxy, $n$ being 1, 2 or 3, R is hydrogen, halogen, —OH, or a saturated or unsaturated lower alkyl, $R_1$ is hydrogen or a saturated alkyl radical of 1–10 carbon atoms inclusive and $R_2$ is a saturated alkyl radical of 1–10 carbon atoms inclusive, $R_1$ and $R_2$ may be taken together with —N< to form a heterocyclic ring consisting of a member of the class piperidine and morpholine, thiomorpholine and pyrrolidine.

These new compounds are useful therapeutic agents and, in general, they are characterized by their toxicity to plasmodia. These compounds may be used either in the form of their bases or their salts with organic or inorganic acids such as hydrochloric acid, sulfuric acid, phosphoric acid, sulfamic acid, acetic acid, lactic acid, tartaric acid, gluconic acid, citric acid and alkyl sulfonic acids or as the insoluble salt of methylene disalicyclic acid.

This application is a continuation-in-part of our copending application, Serial No. 576,900, filed February 3, 1945.

We have found that the compounds of this invention may be prepared by the reaction of the primary amino group of an aminophenol which has at least one unsubstituted position ortho or para to the phenolic hydroxyl, with a reactive halogen atom selected from the class consisting of chlorine and bromine attached to the carbon atom in the 4 position of a quinoline compound of the formula,

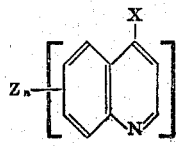

thereby forming hydrogen halide and a 4-(hydroxyanilino) quinoline compound of the general formula,

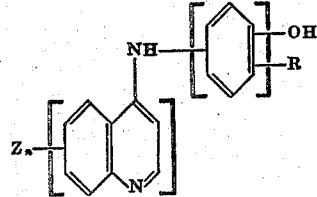

and thereafter condensing said 4-(hydroxyanilino) quinoline with formaldehyde and an amine of the formula,

or with the equivalent products of mixtures of products resulting from the first condensing said amine and formaldehyde, thereby introducing the group

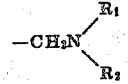

into the aryl nucleus ortho or para to the phenolic hydroxyl to form a compound of the formula,

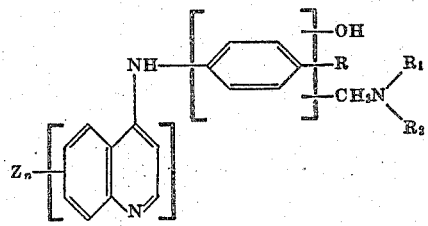

wherein Z, $n$, $R_1$ and $R_2$ have the same significance as given above and X is a chlorine or bromine atom.

The reaction of the aminophenols with the various 4-halo-quinoline compounds may be carried out in an acidic or neutral medium. We prefer to carry out this reaction in an acidic medium, e. g., in the presence of a dilute or concentrated organic acid, a phenol or a dilute inorganic acid. Some examples of the organic acids which we may use are acetic, propionic, butyric and like acids. When the reaction is carried out in the presence of a concentrated organic acid or a phenol, the acid or phenol serves both as a catalyst and a solvent. Some examples of the phenols which we may employ to effect this reaction are phenol, o-cresol, p-cresol, m-cresol, mixed cresols and the like. The inorganic acids which we use are, in general, mineral acids such as hydrochloric, hydrobromic, sulfuric, phosphoric and like acids. Some of the solvents other than the aforementioned concentrated organic acids and phenols which we may use are water, water-water-miscible organic solvent mixtures and anhydrous water-miscible organic solvents. By water-miscible organic solvents we mean such solvents as lower alkyl alcohols such as methanol, ethanol and n-propanol, lower alkyl ketones such as acetone and methyl ethyl ketone, and ethers such as dioxane and ethylene glycol mono-ethyl ether.

The reaction of the 4-(hydroxyanilino) quinolines with formaldehyde and the various amines is preferably carried out in an alcoholic type solvent. Some examples of such solvents are methanol, ethanol, n-propanol, iso-propanol and the like. An acid addition salt of the amine

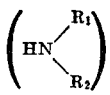

such as the hydrochloride salt may be employed in the reaction instead of the free amine.

The invention is illustrated by the following examples:

*Example 1.—4-(3'-N-piperidylmethyl-4'-hydroxyanilino)-7-chloroquinoline*

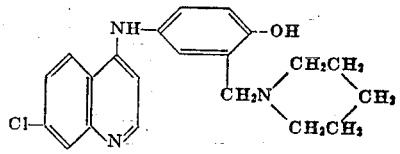

10 g. of p-aminophenol is dissolved in 40 cc. of 2 N hydrochloric acid and 40 cc. of dioxane. The pH of the solution is adjusted to about 4 by the addition of 10 N sodium hydroxide solution and 18.2 g. of 4,7-dichloroquinoline added. The resulting mixture is refluxed for two hours, cooled, diluted to 600 cc. with water and made alkaline with ammonium hydroxide. The precipitated product is removed by filtration, washed well with water and allowed to dry in the air.

A mixture consisting of 10 g. of 4-(4'-hydroxyanilino)-7-chloroquinoline dissolved in absolute ethanol is treated with a solution of 3.1 g. of piperidine and 1.2 g. of formaldehyde in 25 cc. of absolute ethanol. The reaction mixture is heated under reflux for four hours, evaporated to one-half volume and the warm solution treated with an excess of hydrogen chloride in absolute ethanol. Acetone is added until the solution becomes turbid and then the solution is cooled. The crude hydrochloride is recrystallized from absolute ethanol-ethyl acetate mixture; M. P. 301–2° C. dec.

By using an equivalent amount of α-methyl piperidine instead of piperidine in the above procedure one obtains 4-(3'-N-α-methylpiperidyl-methyl-4'-hydroxyanilino)-7-chloroquinoline dihydrochloride; M. P. 286–88° C.

4 - (3' - N - morpholinylmethyl - 4' - hydroxyanilino)-7-chloroquinoline dihydrochloride is obtained by using an equivalent amount of morpholine in the above procedure in place of piperidine; M. P. 292° C. dec.

*Example 2.—4-(3'-diethylaminomethyl-4'-hydroxyanilino)-7-chloroquinoline*

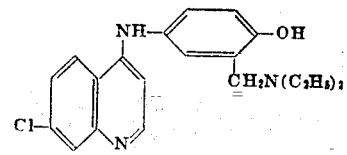

72.8 g. (0.5 mole) of p-aminophenol hydrochloride is dissolved in 500 cc. of water and added to 99 g. (0.5 mole) of 4,7-dichloroquinoline. After a few minutes of warming in a steam bath, 4-(4'-hydroxyanilino)-7-chloroquinoline hydrochloride, of sufficient purity for use in further experiments, precipitates as a yellow crystalline solid. Recrystallized from methanol, the M. P. is over 300° C.

A mixture consisting of 13.5 g. of 4-(4'-hydroxyanilino)-7-chloroquinoline hydrochloride dissolved in absolute ethanol is treated with a solution of 4.38 g. of diethylamine and 1.8 g. of paraformaldehyde in 20 cc. of absolute ethanol. The reaction mixture is heated under reflux for 16 hours, evaporated to one-half volume and the warm solution treated with an excess of hydrogen chloride dissolved in absolute ethanol. Acetone is added to the warm solution until it becomes turbid and then the solution is cooled. The crude dihydrochloride which separates is collected and purified by recrystallization from methanol; M. P. 240–2° C.

By using an equivalent amount of 4-(4'-hydroxyanilino)-7-bromoquinoline in the above procedure, 4 - (3' - diethylaminomethyl-4'-hydroxyanilino)-7-bromoquinoline dihydrochloride is obtained; M. P. (base) 206–8° C. dec.

*Example 3.—4-(3'-ethylaminomethyl-4'-hydroxyanilino)-7-chloroquinoline*

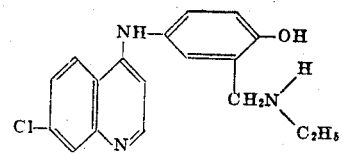

A mixture consisting of 30.7 g. (0.1 mole) of 4-(4'-hydroxyanilino)-7-chloroquinoline hydrochloride (prepared as described in Example 2), 6.3 g. (0.2 mole) of paraformaldehyde and 27.2 cc. (0.2 mole) of an alcoholic solution of ethylamine in 125 cc. of absolute alcohol is refluxed for sixteen hours. The volatile materials are removed by distillation under reduced pressure, and the residue is treated with 100 cc. of warm 2 N hydrochloric acid. The undissolved solid is removed by filtration and the filtrate made alkaline with ammonia and extracted with chloroform. The chloroform extracts are dried, filtered and then evaporated to dryness. The residue is taken up in acetone and an excess of dry hydrogen chloride gas passed into the solution. The precipitated dihydrochloride of the product is collected and purified by recrystallization from methanol or ethanol; M. P. 280° C. with decomposition.

By using n-propylamine in the above procedure instead of ethylamine 4-(3'-n-propylaminomethyl-4'-hydroxyanilino)-7-chloroquinoline dihydrochloride is obtained.

Example 4.—4-(3'-di-n-butylaminomethyl-4'-hydroxyanilino)-7-chloroquinoline

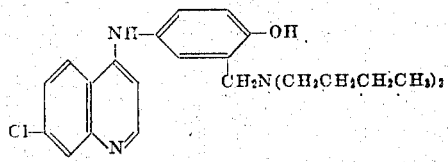

A solution of 1.8 g. of paraformaldehyde and 7.75 g. of di-n-butylamine in 20 cc. of methanol is added to a solution of 13.5 g. of 4-(4'-hydroxyanilino)-7-chloroquinoline in methanol. The resulting mixture is refluxed for 24 hours and then approximately one-half of the methanol distilled off. The residue is cooled and the crystalline dihydrochloride of 4-(3'-di-n-butylaminomethyl-4'-hydroxyanilino) - 7 - chloroquinoline, which separates, collected and purified by recrystallization from methanol-acetone mixture; M. P. 202–4° C.

A further quantity of the product may be obtained by adding acetone to the reaction mixture filtrate.

By using an equivalent amount of ethyl-n-butylamine in the above procedure instead of di-n-butylamine one obtains 4-[3'-(ethyl-n-butyl)-aminomethyl-4'-hydroxyanilino]-7-chloroquinoline dihydrochloride.

Example 5.—4-(3'-N-piperidylmethyl-4',6'-dihydroxyanilino)-7-chloroquinoline

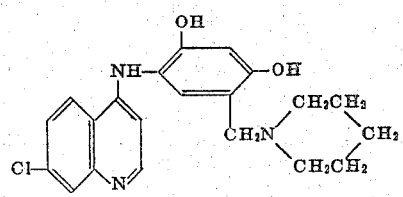

A mixture consisting of 10 g. of 4,7-dichloroquinoline and 10 g. of 2,4-dihydroxyaniline hydrochloride in 200 cc. of water is refluxed for one-half hour. The solution is cooled, diluted to 600 cc. with water and made alkaline with ammonium hydroxide. The precipitated 4-(2',4'-dihydroxyanilino) - 7 - chloroquinoline is collected, washed with water and dried in the air.

A solution 1.8 g. of paraformaldehyde and 4.8 g. piperidine in 20 cc. of methanol is added to a solution of 14.3 g. of 4-(2',4'-dihydroxyanilino)-7-chloroquinoline in 300 cc. of methanol and the resulting mixture refluxed for twelve hours. Approximately one-half of the methanol is removed by distillation and the solution treated with an excess of dry hydrogen chloride. On standing in the refrigerator the crystalline hydrochloride of 4-(3'-N-piperidylmethyl-4',6'-dihydroxyanilino)-7-chloroquinoline separates. The product is cooled, washed with acetone and purified by recrystallization from methanol-acetone mixture.

Example 6.—4-(3'-diethylaminomethyl-4'-hydroxy-5'-allylanilino)-7-chloroquinoline

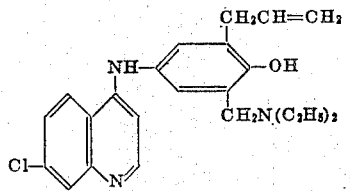

7.6 g. of 3-allyl-4-hydroxyaniline is dissolved in 150 cc. of water and the pH of the solution adjusted to about 4 by the addition of 6-N-hydrochloric acid. 10 g. of 4,7-dichloroquinoline is added and the mixture refluxed for two hours. The solution is diluted to a volume of 500 cc. and the 4-(3'-allyl-4'-hydroxyanilino)-7-chloroquinoline precipitated by the addition of ammonium hydroxide. The product is removed by filtration, washed with water and allowed to dry in the air.

15.6 g. of 4-(3'-allyl-4'-hydroxyanilino)-7-chloroquinoline is dissolved in absolute methanol and the solution treated with a solution of 4.4 g. of diethylamine and 1.8 g. paraformaldehyde in 25 cc. of absolute methanol. The reaction mixture is refluxed for ten hours and then evaporated to about one-half volume. An excess of dry hydrogen chloride in methanol is added to the solution and the hydrochloride precipitated by the addition of anhydrous ether. The crude hydrochloride is treated with 300 cc. of water, solution made alkaline with ammonium hydroxide, and the base extracted with ether. The ether extracts are dried over sodium sulfate, the drying agent removed by filtration and the ether evaporated. The base is taken up in hot isopropanol and are crystallized several times from this solvent; M. P. 154–5° C.

By using piperidine instead of diethylamine in the above procedure one obtains 4-(3'-N-piperidylmethyl- 4'-hydroxy- 5' -allylanilino)-7-chloroquinoline; M. P. 189–90° C.

Example 7.—3-methyl-4-(3'-n-butylaminomethyl-4'-hydroxyanilino)-7-chloroquinoline

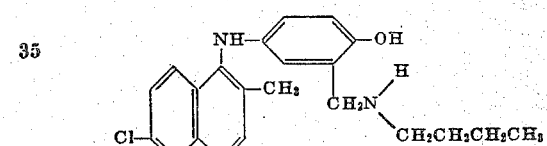

11 g. of p-aminophenol is dissolved in 250 cc. of water and the pH of the solution adjusted to about 4 by the addition of concentrated hydrochloric acid. 20 g. of 3-methyl-4,7-dichloroquinoline is added and the mixture refluxed for three hours. The solid hydrochloride of product is collected, washed with water and dried.

A solution of 1.8 g. of paraformaldehyde and 4.3 g. of n-butylamine in 25 cc. methanol is added to 14.2 g. of 3-methyl-4-(4'-hydroxyanilino)-7-chloroquinoline hydrochloride in 300 cc. of methanol and mixture refluxed for twenty-four hours. The volatile materials are removed by distillation under reduced pressure, and the residue is treated with 100 cc. of warm 2 N hydrochloric acid. The undissolved solid is removed by filtration and the filtrate made alkaline with ammonia and extracted with chloroform. The chloroform extracts are evaporated to dryness and the residue taken up in acetone. The solution is treated with an excess of dry hydrogen chloride gas and the dihydrochloride, which separates, collected and purified by recrystallization from absolute methanol.

Example 8.—3-methyl-4-(3'-N-morpholinylmethyl-4'-hydroxyanilino)-7-chloroquinoline

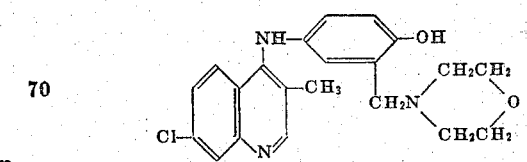

A solution of 4.9 g. of morpholine and 1.8 g. of paraformaldehyde in 20 cc. of alcohol is added to 14.2 g. of 3-methyl-4-(4'-hydroxyanilino)-7-chloroquinoline in 40 cc. of methanol and the mixture refluxed for sixteen hours. An excess of alcoholic hydrogen chloride, followed by about 100 cc. of acetone, is added to the reaction mixture and the crude dihydrochloride collected and purified by recrystallization from methanol-acetone mixture; M. P. 242° C. dec.

*Example 9.—4-(3'-N-piperidylmethyl-4'-hydroxyanilino)-6-methoxyquinoline*

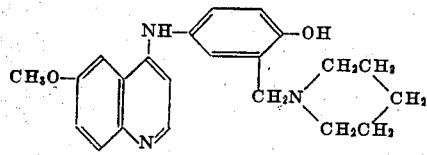

10 g. of p-aminophenol is dissolved in 40 cc. of 2 N hydrochloric acid and 40 cc. of dioxane. The pH of the solution is adjusted to about 4 by the addition of 10 N sodium hydroxide solution and 17.7 g. of 4-chloro-6-methoxyquinoline added. The resulting mixture is refluxed for two hours, cooled, diluted to 600 cc. with water and made alkaline with ammonium hydroxide. The precipitated product is removed by filtration, washed well with water and allowed to dry in the air.

A mixture consisting of 10 g. of 4-(4'-hydroxyanilino)-6-methoxyquinoline dissolved in absolute ethanol is treated with a solution of 3.2 g. of piperidine and 1.2 g. of formaldehyde in 25 cc. of absolute ethanol. The reaction mixture is heated under reflux for four hours, evaporated to one-half volume and the warm solution treated with an excess of hydrogen chloride in absolute ethanol. Acetone is added until the solution becomes turbid and then the solution is cooled. The crude hydrochloride is recrystallized from the absolute ethanol-ethyl acetate mixture; M. P. 270° C. dec.

*Example 10.—4(3'-N-pyrrolidylmethyl-4'-hydroxylanilino)-6-methoxyquinoline*

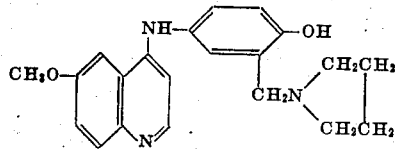

13.3 g. of 4-(4'-hydroxyanilino)-6-methoxyquinoline is added to a solution of 1.65 g. of paraformaldehyde and 4.4 g. of pyrrolidine in 400 cc. of methanol and the mixture refluxed for fifteen hours. The reaction mixture is evaporated to a volume of about 150 cc., cooled and treated with an excess of dry hydrogen chloride. The crystalline dihydrochloride, which separates, is collected and purified by recrystallization from methanol-acetone mixture.

*Example 11.—4-(2'-hydroxy-3'-diethylaminoethyl-5'-chloroanilino)-6-methoxyquinoline*

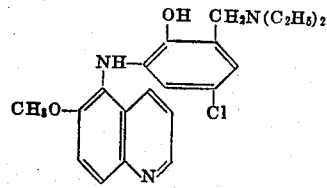

14.5 g. of 2-hydroxy-5-chloroaniline is dissolved in 500 cc. of 95% ethanol and 6 cc. of concentrated hydrochloric acid. 19.4 g. of 4-choloro-6-methoxyquinoline is added and the mixture refluxed for three hours, evaporated to dryness and the residue treated with 700 cc. of water. The 4-(2'-hydroxy-5'-chloroanilino)-6-methoxyquinoline is precipitated by the addition of ammonium hydroxide, collected, washed with water and dried.

15 g. of 4-(2'-hydroxy-5'-chloroanilino)-6-methoxyquinoline is added to a solution of 1.8 g. of paraformaldehyde and 4.4 g. of diethylamine in 500 cc. of methanol and the resulting mixture refluxed for twenty-four hours. The mixture is made alkaline with ammonium hydroxide, evaporated to dryness and the residue treated with 300 cc. of water. The free base is extracted with ether, the ether extract dried and the dried extract treated with an excess of dry hydrogen chloride. The precipitated dihydrochloride is collected and purified by recrystallization from absolute methanol; M. P. 205° C. dec.

*Example 12.—4-(3'-di-n-hexylaminomethyl-4'-hydroxyanilino)-6,7-dimethylquinoline*

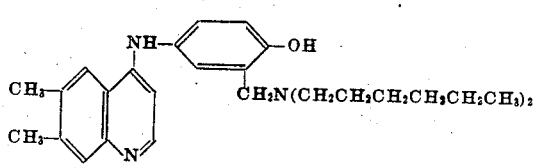

5.7 g. of p-aminophenol is dissolved in 300 cc. of water and 100 cc. of dioxane and the pH of the solution adjusted to about 4 by the addition of concentrated hydrochloric acid. 19.1 g. of 4-chloro-6,7-dimethylquinoline is added and the mixture refluxed for three hours. The solution is cooled, diluted with about 200 cc. of water and made alkaline with ammonium hydroxide. The precipitated 4-(4'-hydroxyanilino)-6,7-dimethylquinoline is removed by filtration, washed well with water and allowed to dry in the air.

A solution of 1.8 g. of paraformaldehyde and 11 g. of di-n-hexylamine in 25 cc. of methanol is added to 13.2 g. of 4-(4'-hydroxyanilino)-6,7-dimethylquinoline in 400 cc. methanol. The mixture is refluxed for twenty-four hours, evaporated to about one-third volume and treated with an excess of dry hydrogen chloride. Acetone is added and the precipitated hydrochloride removed by filtration and purified by recrystallization from absolute methanol-acetone mixture.

By using diethylamine in the above procedure 4-(3'-diethylaminomethyl-4'-hydroxyanilino)-6,7-dimethylquinoline is obtained; M. P. (base) 215° C.

*Example 13.—4-(3'-N-piperidylmethyl-4'-hydroxy-6'-chloroanilino)-7-bromoquinoline*

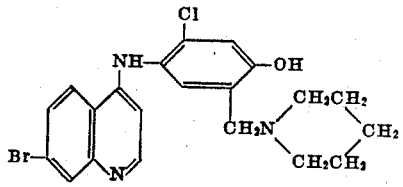

14.5 g. of 2-chloro-4-hydroxyaniline is dissolved in 300 cc. of water and 40 cc. 2 N hydrochloric acid. The pH of the solution is adjusted to about 4 by the addition of 10 N sodium hydroxide solution and 28.7 g. of 4,7-dibromoquinoline and 100 cc. of dioxane are added. The resulting mixture is refluxed for four hours, cooled, diluted with about 300 cc. of water and made alkaline with ammonium hydroxide. The 4-(2'-chloro-4'-hydroxyanilino)-7-bromoquinoline, which separates, is removed by filtration, washed with water and allowed to dry in the air.

17.5 g. of 4-(2'-chloro-4'-hydroxyanilino)-7- bromoquinoline in 400 cc. of methyl is added to a solution of 1.7 g. of paraformaldehyde and 5 g. of piperidine in 30 cc. of methanol and the mixture refluxed for twelve hours. The reaction mixture is evaporated to dryness, and the residue treated with 400 cc. of water and the mixture made alkaline with ammonium hydroxide. The base is extracted with chloroform, the chloroform extracts dried and treated with an excess of dry hydrogen chloride. The gummy dihydrochloride which separates is collected and recrystallized from methanol.

*Example 14.—4-(2'-bromo-4'-diethylaminomethyl-5'-hydroxyanilino)-7-cyanoquinoline*

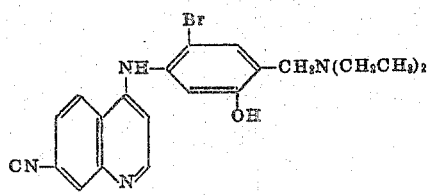

19 g. of 2-bromo-5-hydroxyaniline is added to a solution of 18.9 g. of 4-chloro-7-cyanoquinoline dissolved in 200 cc. of phenol. The mixture is heated at 110° for seven hours, then poured into one liter of water and the mixture made alkaline with ammonium hydroxide. The 4-(2'-bromo-5'-hydroxyanilino)-7-cyanoquinoline which separates is collected, washed well with water and dried in the air.

A solution of 1.8 g. of paraformaldehyde and 4.4 g. of diethylamine in 20 cc. of methanol is added to 17 g. of 4-(2'-bromo-5'-hydroxyanilino)-7-cyanoquinoline in 400 cc. of methanol and the resulting mixture refluxed for twelve hours. The mixture is evaporated to one-half volume, treated with an excess of dry hydrogen chloride and the dihydrochloride salt precipitated by the addition of acetone. The crude dihydrochloride is purified by recrystallization from absolute methanol.

*Example 15.—4-(3'-diethylaminomethyl-4'-hydroxyanilino)-5-chloro-8-methoxyquinoline*

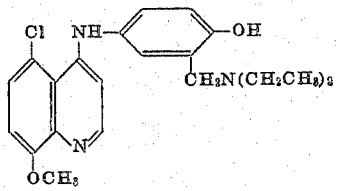

11.5 g. of p-aminophenol is dissolved in 500 cc. of water and the pH of the solution adjusted to about 4 by the addition of sulfuric acid. 22.8 g. of 4,5-dichloro-8-methoxyquinoline is added and the mixture refluxed for four hours, cooled, and made alkaline with ammonium hydroxide. The precipitated 4-(4'-hydroxyanilino)-5-chloro-8-methoxyquinoline is removed by filtration, washed with water and dried.

A solution of 1.8 g. of paraformaldehyde and 4.4 g. of diethylamine in 25 cc. methanol is added to a solution of 15 g. of 4-(4'-anilino-5-chloro-8-methoxyquinoline in methanol and resulting mixture refluxed for sixteen hours. The reaction mixture is concentrated to about one-half volume, an excess of dry hydrogen chloride gas added and the dihydrochloride precipitated by the addition of acetone. The crude dihydrochloride is purified by recrystallization from methanol acetone mixture; M. P. 230–31° C. dec.

The 4-haloquinolines used as starting materials can be prepared by the method of Magidson and Rubstov [J. Gen. Chem. (U. S. S. R.), 7, 1896 (1937); C. A., 32, 564 (1938)] or from the corresponding hydroxyquinolines which may be prepared by the method of Gould and Jacobs [J. Am. Chem. Soc., 61, 2890 (1939)] or by that of Theos J. Thompson [M. S. Thesis, University of Nebraska, July 24 (1942)]. The 3-substituted-4-hydroxyquinolines are prepared by the method given in U. S. Patent No. 2,233,970.

Attention is directed to our copending applications Serial No. 556,496, filed Sept. 29, 1944; Serial No. 576,900, filed Feb. 8, 1945; and Serial Nos. 626,907 and 626,908, both filed on Nov. 5, 1945, wherein we have disclosed and claimed certain of the quinoline compounds which may be produced by the process claimed in the instant case.

What we claim as our invention is:

1. Process for obtaining a compound of the formula,

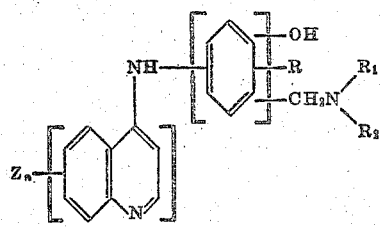

which comprises reacting an aminophenol having at least one unsubstituted position ortho and para to the phenolic hydroxyl radical with a 4-haloquinoline compound of the formula,

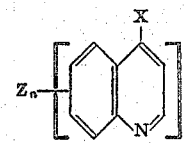

thereby forming hydrogen halide and a 4-(hydroxyanilino) quinoline compound of the formula,

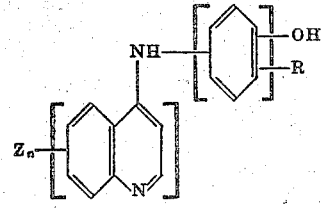

and thereafter condensing said 4-(hydroxyanilino) quinoline with a reactant of the group consisting of a mixture of formaldehyde and an amine of the formula,

and equivalent reaction products resulting from first condensing said amine and formaldehyde, thereby introducing the group

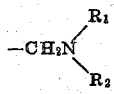

into the aryl nucleus in one of the positions ortho and para with respect to the phenolic hydroxyl radical present in said nucleus, where X is a member of the class consisting of chlorine and bromine, Z is a member of the class consisting of hydrogen, halogen, —CN, lower alkyl and lower alkoxy, $n$ is one of the integers consisting of one and two, R is a member of the class consisting of hydrogen, halogen, —OH, and lower alkenyl, $R_1$ is a member of the class consisting of hydrogen and alkyl radicals of 1 to 10 carbon atoms inclusive, $R_2$ is a member of the class consisting of alkyl radicals of 1 to 10 carbon atoms inclusive and further members in which $R_1$ and $R_2$ taken together with —N< forms a heterocyclic ring containing not more than five carbon atoms.

2. Process for obtaining a compound of the formula,

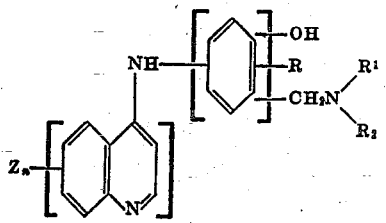

which comprises reacting an aminophenol having at least one unsubstituted position ortho and para to the phenolic hydroxyl radical with a 4-haloquinoline compound of the formula,

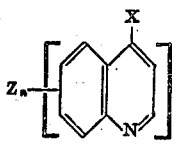

in the presence of acids thereby forming hydrogen halide and a 4-(hydroxyanilino) quinoline compound of the formula,

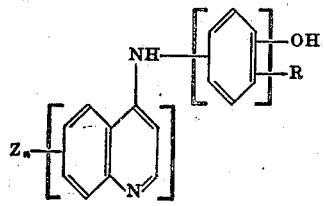

and thereafter condensing said 4-(hydroxyanilino) quinoline with a reactant of the group consisting of a mixture of formaldehyde and an amine of the formula,

and equivalent reaction products resulting from first condensing said amine and formaldehyde, thereby introducing the group

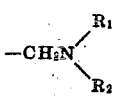

into the aryl nucleus in one of the positions ortho and para with respect to the phenolic hydroxyl radical present in said nucleus, where X is a member of the class consisting of chlorine and bromine, Z is a member of the class consisting of hydrogen, halogen, —CN, lower alkyl and lower alkoxy, $n$ is one of the integers consisting of one and two, R is a member of the class consisting of hydrogen, halogen, —OH, and lower alkenyl, $R_1$ is a member of the class consisting of hydrogen and alkyl radicals of 1 to 10 carbon atoms inclusive, $R_2$ is a member of the class consisting of alkyl radicals of 1 to 10 carbon atoms inclusive and further members in which $R_1$ and $R_2$ taken together with —N< form of a heterocyclic ring containing not more than five carbon atoms.

3. Process for obtaining a compound of the formula,

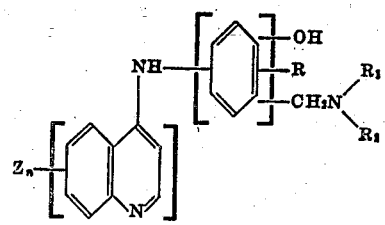

which comprises reacting an aminophenol having at least one unsubstituted position ortho and para to the phenolic hydroxyl radical with a 4-haloquinoline compound of the formula,

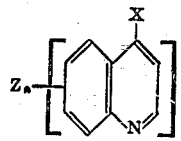

in the presence of a dilute mineral acid thereby forming hydrogen halide and a 4-(hydroxyanilino) quinoline compound of the formula,

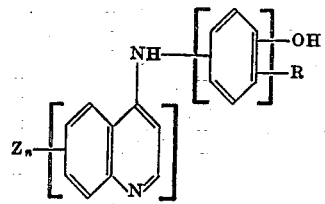

and thereafter condensing said 4-(hydroxyanilino) quinoline with a reactant of the group consisting of a mixture of formaldehyde and an amine of the formula,

and equivalent reaction products resulting from first condensing said amine and formaldehyde, therby introducing the group

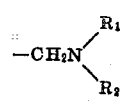

into the aryl nucleus in one of the positions ortho and para with respect to the phenolic hydroxyl radical present in said nucleus, where X is a member of the class consisting of chlorine and bromine, Z is a member of the class consisting of hydrogen, halogen, —CN, lower alkyl and lower alkoxy, $n$ is one of the integers consisting of one and two, R is a member of the class consisting of hydrogen, halogen, —OH, and lower alkenyl, $R_1$ is a member of the class consisting of hydrogen and alkyl radicals of 1 to 10 carbon atoms inclusive, $R_2$ is a member of the class consisting of alkyl radicals of 1 to 10 carbon atoms inclusive and further members in which $R_1$ and $R_2$ taken together with —N< form of heterocyclic ring containing not more than five carbon atoms.

4. Process for obtaining a compound of the formula,

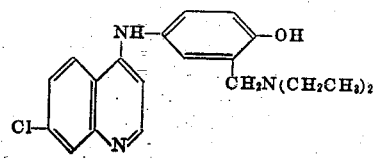

which comprises reacting p-aminophenol with a 4-haloquinoline compound of the formula,

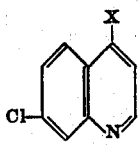

thereby forming hydrogen halide and a 4-(hydroxyanilino)-quinoline compound of the formula,

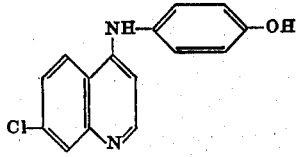

and thereafter condensing said 4-(hydroxyanilino) quinoline with a reactant of the group consisting of a mixture of formaldehyde and diethylamine and equivalent reaction products resulting from first condensing diethylamine and formaldehyde, thereby introducing the group —CH$_2$N(CH$_2$CH$_3$)$_2$ into the aryl nucleus, where X is a member of the class consisting of chlorine and bromine.

5. Process for obtaining a compound of the formula,

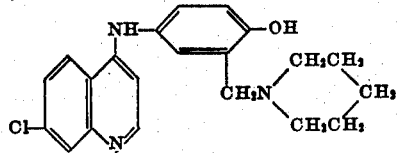

which comprises reacting p-aminophenol with a 4-haloquinoline compound of the formula,

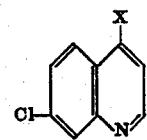

thereby forming hydrogen halide and a 4-(hydroxyanilino)-quinoline compound of the formula,

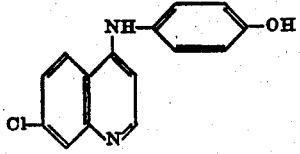

and thereafter condensing said 4-(hydroxyanilino) quinoline with a reactant of the group consisting of a mixture of formaldehyde and piperidine and equivalent reaction products resulting from first condensing piperidine and formaldehyde, thereby introducing the group

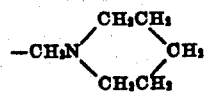

into the aryl nucleus, where X is a member of the class consisting of chlorine and bromine.

6. Process for obtaining a compound of the formula,

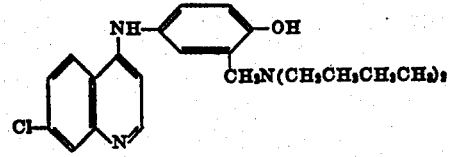

which comprises reacting p-aminophenol with a 4-haloquinoline compound of the formula,

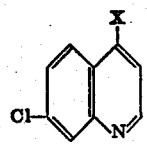

thereby forming hydrogen halide and a 4-(hydroxyanilino) quinoline compound of the formula,

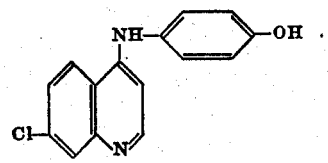

and thereafter condensing said 4-(hydroxyanilino) quinoline with a reactant of the group consisting of a mixture of formaldehyde and di-n-butylamine and equivalent reaction products resulting from first condensing di-n-butylamine and formaldehyde, thereby introducing the group —CH$_2$N(CH$_2$CH$_2$CH$_2$CH$_3$)$_2$ into the aryl nucleus, where X is a member of the class consisting of chlorine and bromine.

7. A compound of the class consisting of a free base and its acid addition salts, said free base having the formula,

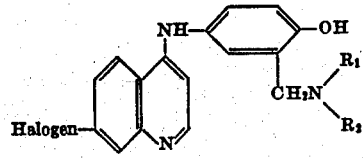

where R$_1$ is a member of the class consisting of hydrogen and alkyl radicals of 1 to 10 carbon atoms inclusive, R$_2$ is a member of the class consisting of alkyl radicals of 1 to 10 carbon atoms inclusive and further members in which R$_1$ and R$_2$ taken together with —N< form a heterocyclic ring containing not more than five carbon atoms.

8. A compound of the formula,

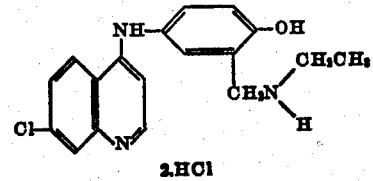

2.HCl

9. A compound of the formula,

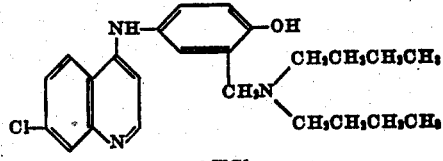

2.HCl

JOSEPH H. BURCKHALTER.
ELDON M. JONES.
ALBERT L. RAWLINS.
FRANK H. TENDICK.
WALTER F. HOLCOMB.

REFERENCES CITED

The following references are of record in the file of this patent:

UNITED STATES PATENTS

| Number | Name | Date |
|---|---|---|
| 1,891,980 | Hartmann | Dec. 27, 1932 |
| 1,896,461 | Muth | Feb. 7, 1933 |
| 1,902,103 | Schonhofer | Mar. 21, 1933 |